United States Patent
Reimann et al.

(10) Patent No.: US 9,734,951 B2
(45) Date of Patent: Aug. 15, 2017

(54) MEMS ELECTROSTATIC ACTUATOR

(75) Inventors: Klaus Reimann, Eindhovern (DE); Aarnoud Laurens Roest, Geldrop (NL); Jin Liu, Amersfoort (NL)

(73) Assignee: NXP B.V., Eindhoven (NL)

( * ) Notice: Subject to any disclaimer, the term of this patent is extended or adjusted under 35 U.S.C. 154(b) by 1253 days.

(21) Appl. No.: 13/255,479

(22) PCT Filed: Mar. 10, 2010

(86) PCT No.: PCT/IB2010/051036
§ 371 (c)(1),
(2), (4) Date: Oct. 24, 2011

(87) PCT Pub. No.: WO2010/103474
PCT Pub. Date: Sep. 16, 2010

(65) Prior Publication Data
US 2012/0055768 A1   Mar. 8, 2012

(30) Foreign Application Priority Data
Mar. 11, 2009 (EP) ..................... 09100177

(51) Int. Cl.
*H01G 5/013* (2006.01)
*H01G 5/011* (2006.01)
*H01G 5/16* (2006.01)

(52) U.S. Cl.
CPC ........... *H01G 5/0136* (2013.01); *H01G 5/011* (2013.01); *H01G 5/16* (2013.01)

(58) Field of Classification Search
CPC .................................................. H01G 5/0136
See application file for complete search history.

(56) References Cited

U.S. PATENT DOCUMENTS

| | | | |
|---|---|---|---|
| 6,696,343 B1 | 2/2004 | Chinthakindi et al. | |
| 6,906,905 B1 | 6/2005 | Chinthakindi | |
| 8,736,404 B2* | 5/2014 | Knipe et al. ................... | 335/78 |
| 2003/0148550 A1* | 8/2003 | Volant et al. .................. | 438/52 |
| 2006/0209491 A1 | 9/2006 | Ikehashi et al. | |

(Continued)

FOREIGN PATENT DOCUMENTS

| | | |
|---|---|---|
| TW | 517042 B | 1/2003 |
| WO | 2008/152559 A2 | 12/2008 |

OTHER PUBLICATIONS

Yoon, J.-B. et al "A High-Q Tunable Micromechanical Capacitor With Movable Dielectric for RF Applications", IEEE Tech. Dig. IEDM2000, pp. 489-492 (2000).

(Continued)

*Primary Examiner* — Mohamad Musleh (57) ABSTRACT

A MEMS electrostatic actuator comprises first and second opposing electrode arrangements, wherein at least one of the electrode arrangements is movable. A dielectric material (24) is adjacent the one of the electrode arrangements (22). The second electrode arrangement is patterned such that it includes electrode areas (26) and spaces adjacent the electrode areas, wherein the dielectric material (24) extends at least partially in or over the spaces. The invention uses a multitude of electrode portions as one plate. The electric field lines thus form clusters between the individual electrode portions and the opposing electrode. This arrangement provides an extended range of continuous actuation and tunability.

15 Claims, 5 Drawing Sheets (56) References Cited

U.S. PATENT DOCUMENTS

2006/0226501 A1    10/2006  Chou
2008/0180876 A1     7/2008  Shimanouchi et al.

OTHER PUBLICATIONS

Chen, J. et al. "Design and Modeling of a Micromachined High-Q Tunable Capacitor with Large Tuning Range and a Vertical Planar Spiral Inductor" IEEE Transaction on Electron Devices, vol. 50, No. 3, pp. 730-739 (Mar. 2003).
Yalcinkaya, A. D. et al. "Low Voltage, High-Q SOI MEMS Varactors for RF Applications", IEEE Proc. ESSCIR'03, pp. 607-610 (2003).
Muldavin, J. et al. "Large Tuning Range Analog and Multi-bit MEMS Varactors" IEEE MTT-S Digest, vol. 3, pp. 1919-1922 (2004).
Nguyen, H. D. "Angular Vertical Comb-Driven Tunable Capacitor With High-Tuning Capabilities", Journal of Microelectromechanical Systems, vol. 13, No. 3, pp. 406-413 (Jun. 2004).
Bakri-Kassem, M. et al., "A High-Tuning-Range MEMS Variable Capacitor Using Carrier Beams", Can. J. Elect. Comput. Eng., vol. 31, No. 2, pp. 89-95 (2006).
Legrand, B. et al. "Suppression of the Pull-in Instability for Parallel-Plate Electrostatic Actuators Operated in Dielectric Liquids", Applied Physics Letters 88, 034105, pp. 1-3 (Jan. 2006).
Rijks, Th. G.S.M. et al "Microelectromechanical Tunable Capacitor for Reconfigurable RF Architectures", J. Micromech. Microeng., vol. 16, pp. 601-611 (2006).
International Search Report for Int'l Patent Application. PCT/IB2010/051036 (Sep. 16, 2010).

\* cited by examiner

MEMS ELECTROSTATIC ACTUATOR

This invention relates to tunable MEMS devices, such as capacitors and electrostatic actuators, in particular based on capacitive MEMS structures.

Tunable capacitors can be used in a variety of circuits, such as tunable filters, tunable phase shifters and tunable antennas. One application of growing interest is in RF and microwave communications systems, for example for use in low cost reconfigurable/tunable antennas.

Two of the most promising technologies for making tunable or switchable RF capacitors are RF MEMS switches and relays which provide mechanical alteration to the capacitor spacing, and capacitors with electrically tunable dielectrics.

RF MEMS switches have the advantage of a larger capacitance switching ratio, and tunable dielectrics have the advantage of better continuous capacitance tunability.

It has been proposed to combine these effects, by providing control of the dielectric spacing using a MEMS switch, in combination with a ferroelectric tunable dielectric, such as barium strontium titanate (BST). The combination of discrete control provided by a MEMS switch and analogue electrical control of the dielectric properties can enable continuous tunability of the capacitor.

The invention relates specifically to the control of the dielectric spacing to vary the capacitance, but does not exclude the use of an electrically controllable dielectric.

The electrostatic actuation of a MEMS plate capacitor is continuous until the so-called pull-in point. For a rigid plate, this is ⅓ of the initial electrode spacing. One technique to overcome the limited continuous tuning range is to separate the actuation capacitor from the tuned capacitor.

An alternative is to provide posts or other springs in the way of movement so that the spring constant effectively increases. This approach leads to kinks and/or hysteresis in the capacitance—voltage curves.

Therefore, there remains a need to improve the continuous tuning range of a MEMS capacitor in a simple manner.

According to the invention, there is provided a MEMS electrostatic actuator comprising:

first and second opposing electrode arrangements, wherein at least one of the electrode arrangement is movable; and a dielectric material adjacent the second electrode arrangement, wherein the second electrode arrangement is patterned such that it includes electrode areas and spaces adjacent the electrode areas, wherein the dielectric material extends at least partially in or over the spaces.

The distance between the plates influences how the electric field lines form between the individual electrodes areas, in such a way that pull-in can be delayed. In this way, the invention enables an extended range of continuous tunability.

The first electrode arrangement can be a single electrode or a patterned electrode. In one embodiment, the invention uses an array of electrode portions as one capacitor plate, and a single sheet electrode as the other plate. The electric field lines thus form clusters between the individual electrode portions and the sheet electrode.

Instead of this arrangement, with a single electrode sheet as first electrode, a mirrored version of the second electrode arrangement is also possible. In some cases, the implementation of identical electrodes in this way may be easier.

One electrode arrangement is preferably movable and the other electrode arrangement is fixed. The movable electrode arrangement (which can be the first or second electrode arrangement) preferably comprises a sprung structure suspended over the fixed electrode arrangement.

A second dielectric can be added above the first electrode arrangement. For example the space between electrodes can have a first dielectric, an air or gas or vacuum spacing, and then the dielectric material.

The spacing preferably uses a compressive dielectric with a low dielectric constant.

The second electrode arrangement and said dielectric material can be designed such that $0.2 < k_0 < 5$, where $k_0$ is defined by:

$$k_0 = \sqrt{\frac{g^2}{\varepsilon_f d_f y_0}}$$

wherein $2g$ is the electrode spacing, $\varepsilon_f$ is the relative dielectric constant of the said dielectric material. $d_f$ is the thickness of the said dielectric material and $y_0$ is the maximum electrode movement. More preferably $1 < k_0 < 2$. This relationship is found to provide the best compromise between increased tuning range, and least reduction in capacitance of the open state.

The spacing $2g$ between electrode portions is preferably at least 0.5 times the electrode portion width $w$ (more preferably at least 2 or 5 times) and may be in the range 1 to 100 μm. The second dielectric material can occupy a fraction of up to 0.5 of the spacing between electrode arrangements in their open configuration.

Examples of the invention will now be described in detail with reference to the accompanying drawings, in which.

The invention provides a MEMS tuneable capacitor or a MEMS electrostatic actuator or a MEMS switch. These are all intended to fall within the term "MEMS actuator" as used in this description and claims. Thus, a capacitor can be considered to be an actuator as it is tuned by actuating an electrode. A switch can be considered to be an actuator as it is closed by actuating a metal electrode. A dielectric material is provided adjacent an electrode arranged as an array of discrete electrode portions. The dielectric functions as an electric field guide, which effectively enlarges the size of the electrode portions, and the enlargement is dependent on the capacitor electrode spacing, so that pull-in is delayed. The actuation range and thus the tuning range is extended. The design avoids the need for extra mask steps.

In the figures, the structure of the device is shown only schematically. In particular, the way the top electrode is mounted and the way it moves has not been shown. The detailed implementation will be routine to those skilled in the art of MEMS devices. The invention is not limited to the described planar devices. Horizontally (in-plane) moving devices are equally possible, e.g., comb structures.

Figure 1:
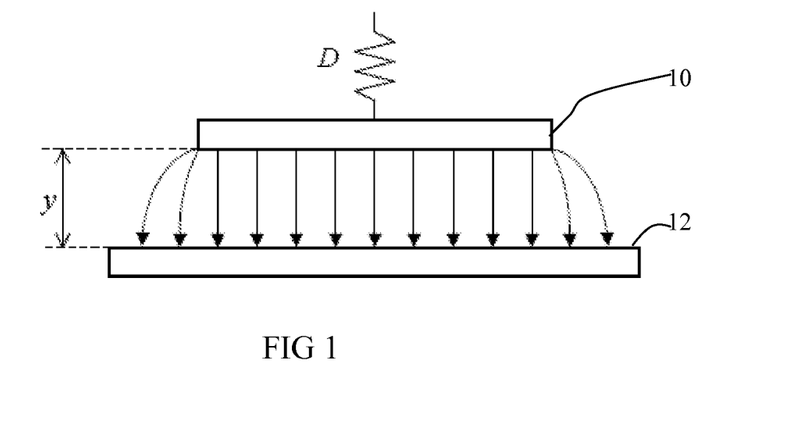
FIG. 1 shows a known MEMS capacitor design.

FIG. 1 shows a conventional MEMS tunable capacitor, with two electrode plates 10,12 separated by a spacing y. The top electrode 10 is movable by electrostatic force against the bias of spring D.

This invention is based on the realization that the field guiding mechanism of thin dielectric layers can be used to influence the electric field properties and in turn improve the tuning range.

Figure 2A:
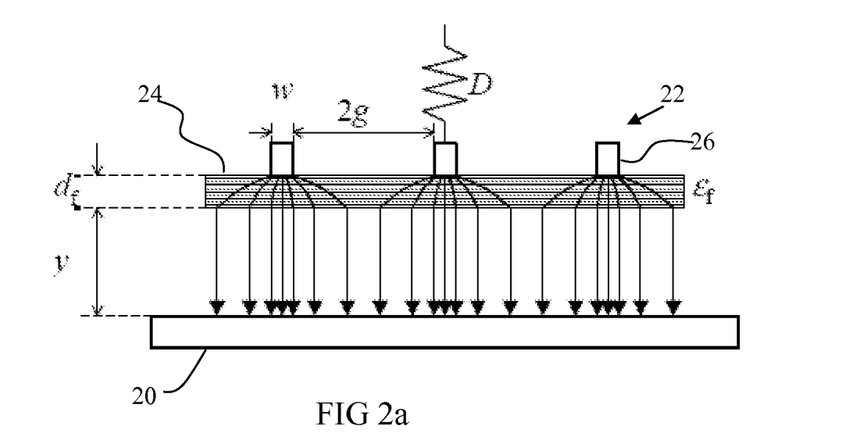
FIG. 2(a) shows a first example of MEMS capacitor design of the invention in open state.
Figure 2B:
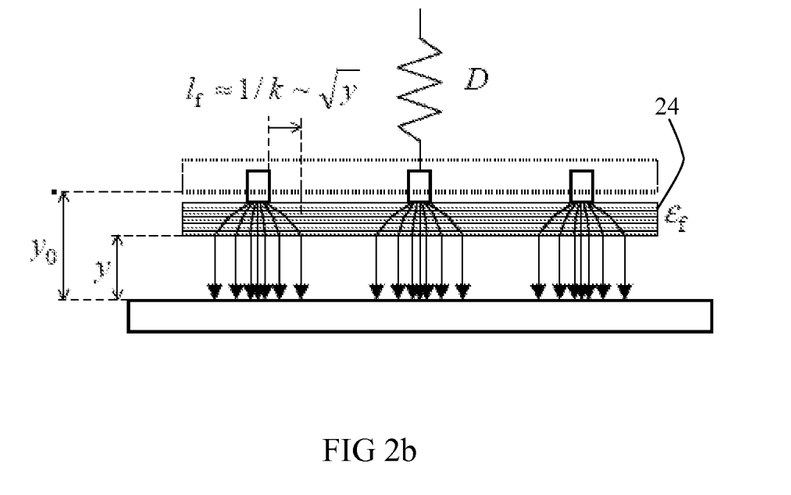
FIG. 2(b) shows the example of MEMS capacitor design of the FIG. 2(a) in a partially closed state.

FIG. 2 demonstrates the operation principle.

FIG. 2(a) shows first 20 and second 22 opposing capacitor electrode arrangements. The first electrode arrangement 20 comprises a single electrode as in the prior art. The second capacitor electrode arrangement 22 is movable by a MEMS switch to vary the capacitor electrode spacing, again against the bias of spring D. Air (a first dielectric material) is between the capacitor electrodes. This could be a different gas, but it could instead be a vacuum (in which case a dielectric "region" can be considered rather than a dielectric material).

There is additionally a second dielectric material 24 in series between the first and second electrode arrangements 20,22. The second dielectric material 24 is adjacent the second electrode arrangement 22, and the second electrode arrangement comprises an array of discrete electrode portions 26. Reference to a dielectric being "between" the electrode arrangements should be understood as meaning they are in the path of the electric field lines between the electrodes, so that they influence the capacitance. Thus, an electrode may be coplanar with its dielectric layer, as will become apparent from further examples below, and this is still within the scope of this term.

Of course, if a vacuum is used, there only needs to be a single dielectric "material"—namely the one adjacent the second electrode arrangement. These are the main dielectric components of the design. Similarly, there may be additional dielectric materials, for example another dielectric layer on the bottom electrode 20.

Although the preferred example shown has one planar and one segmented electrode arrangement, a symmetric arrangement of segmented top and bottom electrodes can be used.

The electrode portions of the second electrode arrangement have a width w and a gap of 2 g, and the thickness of the second dielectric is $d_f$. Of course, FIG. 2 is only a two dimensional representation. The patterning of the electrode in reality in two dimensions, so that 2 g and w refer to effective feature sizes.

The configuration in FIG. 2(a) is for the maximum electrode spacing $y=y_0$. At smaller electrode spacings, the field will concentrate below the electrodes as shown in FIG. 2(b), reducing the electrostatic force at smaller distances.

Fringing fields have a similar effect, so that the electrode patterning contributes to the effect, independently of the field guiding effect of the dielectric. The effect is much greater with the dielectric layer, and it preferably has a high dielectric permittivity, for example $\epsilon_f > 10$.

The field-guiding by the dielectric layer still provides almost the full force at the initial position $y_0$ and does not require sub-micrometer electrode spacings 2 g if the permittivity $\epsilon_f$ of the dielectric layer 24 is sufficiently high.

Simple and approximate modelling can be used to show that the dielectric layer acts as a variable electrode extension $l_f$ that depends on the distance y, approximately in proportion with $\sqrt{y}$, as shown in FIG. 2(b). The maximum displacement by electrostatic actuation is increased from 33% of $y_0$ for the arrangement of FIG. 1 to about 42% of $y_0$. This principle can be combined with all existing MEMS designs that aim at higher actuation ranges, including comb actuators (in which instability is reduced). The second dielectric and the patterned electrode can also be used as a fixed electrode to have more freedom in the process-optimization of the moving electrode. The impact after pull-in is reduced, and this has benefit if the capacitor is being used as a switch, and is thus driven to a fully closed position. Charging in the collapsed state is also then restricted to a smaller area. No extra mask steps and in many cases no extra layers are needed to implement the invention.

The way the invention provides the effects described above will now be explained in more detail, using approximated calculations and simplifications, simply for demonstrating the orders of magnitude of the field guiding effect, and the effect this has on the actuation performance. The device could be simulated and optimized more fully.

The electrostatic force on a MEMS plate capacitor can be derived from an energy formulation and yields a general relationship between the static capacitance Cs (i.e. with the plates of the MEMS capacitor clamped) and the electrostatic force. This approach can use directly the results of 2D or 3D field simulators and is not restricted to homogeneous fields and continuous plates. The change in elastic energy (dW=Fdy) is equal to the change in the electrostatic energy:

$$dW = d(\tfrac{1}{2} C_s U^2) = \tfrac{1}{2} dC_s / dy U^2 dy$$

The force has to be balanced to the linear elastic response which can be described by an effective spring constant D and an effective displacement (y−y0). The equation can be separated in two parts containing either the displacement y or the actuation voltage U:

$$F = \frac{1}{2} U^2 \frac{\partial C_s}{\partial y} = -D(y - y_0)$$

This equation can be simplified by defining new variables, as:

$$\frac{1-x}{\frac{\partial c_s}{\partial x}} - a = 0 \text{ with } a = \frac{1}{2} \frac{C_0 U^2}{D y_0^2},\ c_s = \frac{C_s}{C_0},\ x = \frac{y}{y_0}$$

This equation uses the normalized quantities a (a function of the actuation voltage U), x (a function of the electrode position y) and $c_s$ (a function of x). The scaling capacitance $C_0$ can be freely chosen as is convenient for the calculation, and the capacitor can be designed for a desired value of $C_0$. The scaling factor for the position y is the position $y_0$ at zero voltage. The solution of the above equation x(a) for a given $c_s(x)$ can be used to calculate the normalized static and dynamic capacitance in dependence of the actuation parameter a:

$$c_s(a) = c_s(x(a))$$

The static capacitance is the high-frequency asymptote, whereas the larger dynamic capacitance gives the low frequency limit and includes movement of the capacitor plate due to the applied voltage. This dynamic capacitance is given by:

$$C_d = \frac{\partial Q}{\partial U} = \frac{\partial(C_s U)}{\partial U} = C_s + U\frac{\partial C_s}{\partial U}$$

The normalized dynamic capacitance is given by:

$$c_d = c_s + 2a\frac{\partial c_s}{\partial a}$$

This follows from the above equations.

The way in which the invention changes the capacitance values will now be discussed. For a conventional plate capacitor:

$$c_s(x) = \frac{1}{x} \text{ with } C_0 = \varepsilon_0 \frac{A}{d_0}$$

Fringing fields add an approximately constant capacitance. The electrostatic energy density around an edge becomes higher when the electrodes come closer, but the fringing field is also restricted to a smaller volume. Thus, the equation becomes:

$$c_s(x) = \frac{1}{x} + k_1$$

The arrangement of the invention gives rise to a capacitance defined by:

$$c_s(x) = \frac{1}{k_0\sqrt{x}}\tanh\left(\frac{k_0}{\sqrt{x}}\right) \text{ with } C_0 = n\varepsilon_0 \frac{gl}{y_0}, k_0 = \sqrt{\frac{g^2}{\varepsilon_f d_f y_0}}$$

This ignores fringing fields and assumes ideal small electrodes.

This equation is based on a spacing of 2 g between n electrodes of length l. The field-guiding layer has a thickness of $d_f$ and a permittivity of $\varepsilon_f$. The parameter $k_0$ can be changed by design (spacing 2 g, thickness $y_0$, $d_f$) or by material properties ($\varepsilon_f$).

The limit $k_0 \rightarrow 0$ leads to the plate capacitor case. The limit $k0 \rightarrow$ infinitey leads to $cs \sim (1/x)^{1/2}$, i.e. the capacitance increases more slowly for smaller relative distance x than expected for a plate capacitor. However, the capacitance for very large $k_0$ parameters is affected by fringing fields. Preferably $k_0 < 5$ and more preferably $k_0 < 2$ should be chosen as outlined below.

The largest enhancement in actuation range (displacement y) before pull-in is predicted for $1 < k_0 < 2$ (explained below with reference to FIG. 3b). The largest enhancement in capacitance tuning is predicted for k0->infinity (explained below with reference to FIG. 4). It therefore depends on the application whether it is preferred to set $k_0 \sim 1.4$ or a large $k_0$. However, a very large value of $k_0$ is not practical because the absolute capacitance decreases and parasitic capacitances cause degraded performance (neglected in the calculations above).

Figure 4:
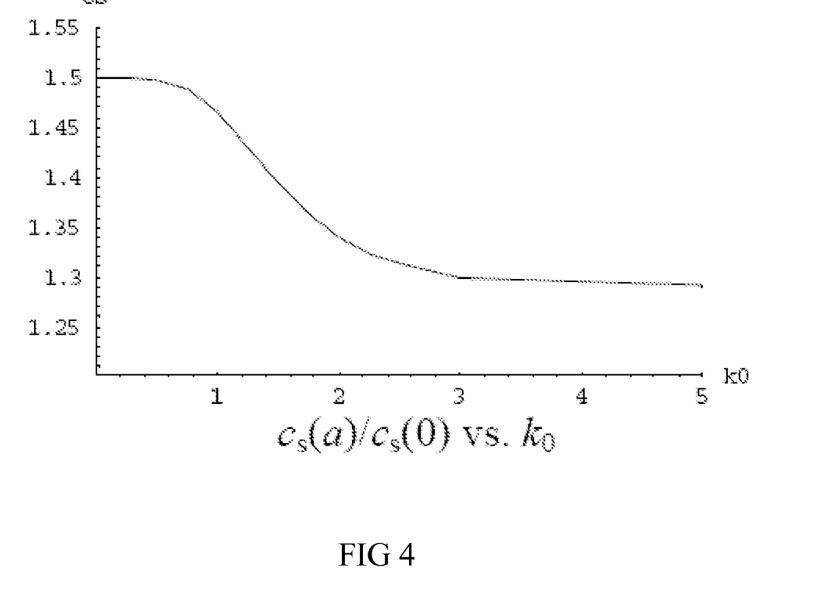
FIG. 4 is a graph to show how the capacitance ratio depends on parameter $k_0$.

For example, with reference to FIG. 4, then $k_0 > 2$ gives almost the full effect. A good compromise for all applications is therefore $k_0 \sim 2$. This is based on an analytical estimate with simplifications. A preferred value might differ and should be determined experimentally or by more detailed simulations.

The electrode width w should be smaller than the spacing g for a noticeable difference to the plate capacitor case.

Figure 3A:
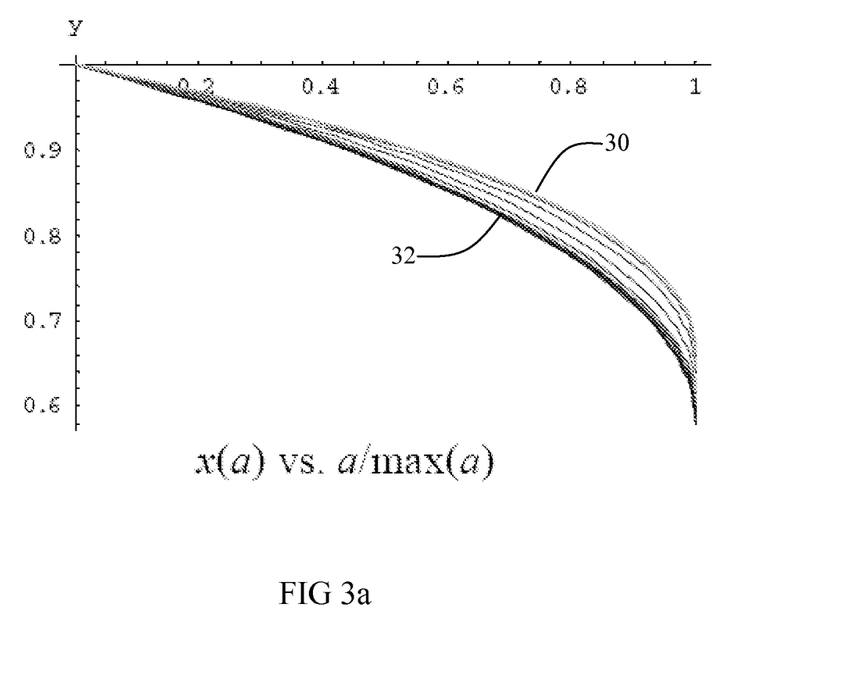
FIG. 3(a) is a graph to explain the pull-in response for the design of the invention and for a standard design
Figure 3B:
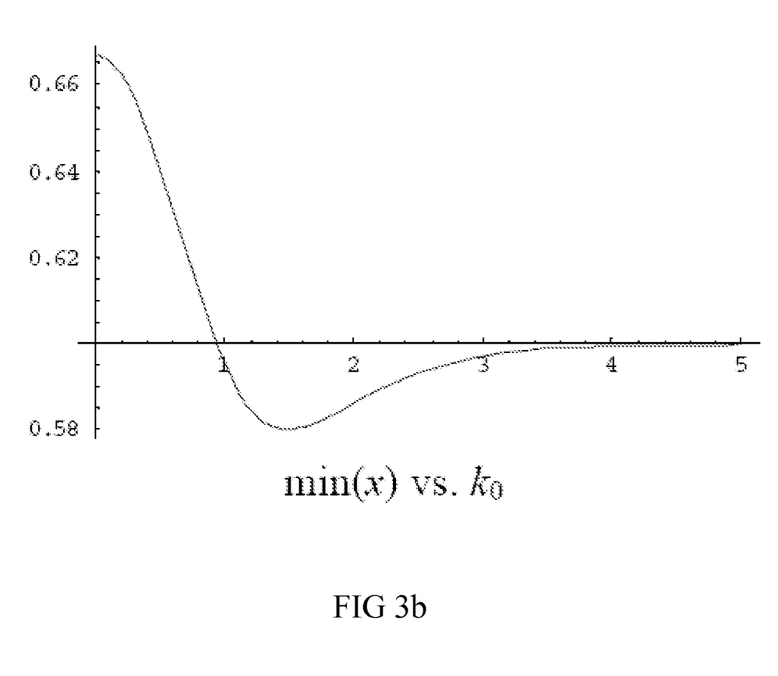
FIG. 3(b) is a graph to show how the pull-in response depends on parameter $k_0$.

FIG. 3 shows the result of the calculation. FIG. 3(a) shows the relative plate position x in dependence on the actuation voltage ($a \sim U^2$). Curve 30 is for the plate capacitor ($k_0 \rightarrow 0$). Curve 32 is for the case where ($k_0 \rightarrow$ infinitey).

Pull-in occurs when the normalized actuation voltage on the x-axis reaches 1. As shown, for the conventional capacitor, plot 30 reaches pull-in when the displacement (y axis) is at approximately 0.7. For the capacitor of the invention, plot 32 reaches pull-in when the displacement (y axis) is at approximately 0.6. More accurate analysis shows that the plate capacitor can be continuously displaced by 1−min(x)= 33% of the original gap. A plate with the field guiding dielectric can produce continuous movements up to 42% of the initial gap before pull-in occurs.

FIG. 3(b) shows the minimum plate distance corresponding to the maximum displacement as a function of the parameter $k_0$. The greatest range of movement is achieved at $k_0 = 1.4$.

The reason is the dielectric layer guides the field less far if the distance between the electrodes is reduced. The effective area is reduced, leading to a smaller force. At the same time, the tuning ratio of the capacitance is slightly reduced as depicted in FIG. 4, which shows the tuning ratio as function of the actuation parameter $k_0$.

This design is therefore best used for continuous actuation purposes.

The design gives two options. One is maximum tuning range and the other is maximum actuation. The ranges overlap at $k_0 \sim 2$. Thus, preferably $0.2 < k_0 < 5$, and more preferably, more preferably $1 < k_0 < 2$.

The table below gives examples using the above formulas for $k_0 = 1.5$ for some material combinations and design parameters. Other combinations are possible. The table lists the half electrode spacing g, and initial gap $y_0$, for a dielectric layer of permittivity $\varepsilon_f$ and thickness $d_f$.

| Dielectric | $\varepsilon_f$ | $d_f$ (um) | $y_0$ (um) | g (um) |
|---|---|---|---|---|
| $Si_3N_4$ | 7.5 | 1 | 1 | 4 |
| $HfO_2, Ta_2O_5$ | 20-25 | 0.3 | 1 | 4 |
| $TiO_2$ | 85 | 0.3 | 1 | 8 |
| BST | 400 | 0.2 | 1 | 13 |
| PZT | 1000 | 0.3 | 1 | 26 |

Various specific designs are possible and a number of possible examples will now be described.

Figure 5:
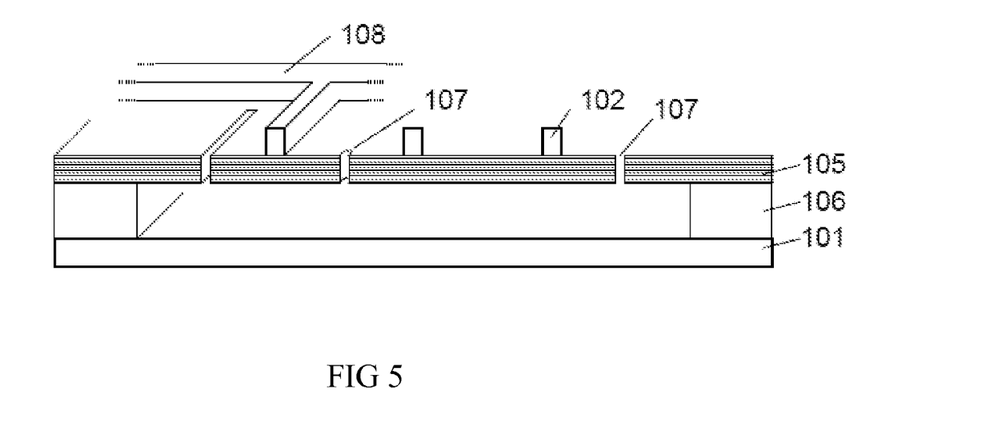
FIG. 5 shows a second example of MEMS capacitor design of the invention.

FIG. 5 shows an implementation in which the electrode portions 102 form a comb structure, with a connecting beam 108. The patterned electrode is formed over a cavity formed by a sacrificial layer 106 over the substrate 101. Slots 107 in the dielectric layer allow the removal of the sacrificial layer after the comb structure has been formed.

Figure 6:
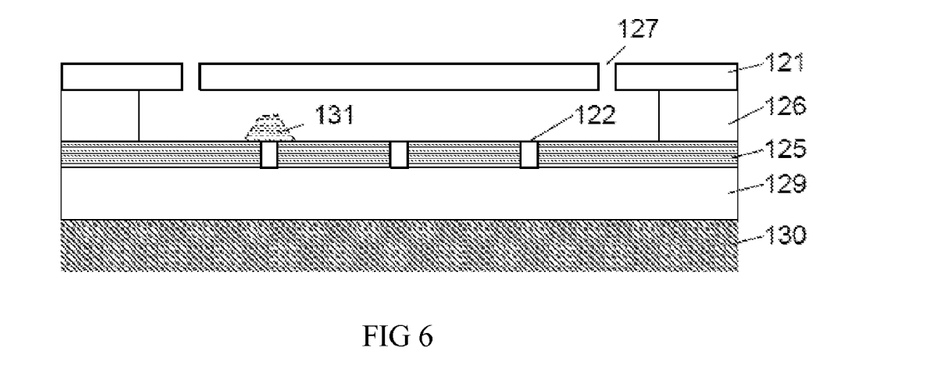
FIG. 6 shows a third example of MEMS capacitor design of the invention.

In this arrangement, the dielectric layer is not continuous, but it still extends over the spacing between the electrode portions. Preferably, the dielectric material 105 extends into the spaces by at least 0.5 g/$k_0$ (with $k_0$ defined as above). Preferably, the extension of the dielectric beyond the edge of the electrode portion is greater than 2 g/$k_0$ FIG. 6 shows an arrangement in which the patterned electrode and field guide form the static plate. The substrate is shown as 130. The dielectric layer 125 is formed in the same layer as the electrode portions 122 with the two layers being planarized. They are provided over a further low dielectric constant layer 129. The cavity is again formed by a sacrificial etching process, with the single movable plate electrode above formed from layer 121. A pattern 127 allows movement of the top electrode.

FIG. 6 also shows bumps 131 provided over the electrodes for example formed from silicon dioxide. These can result from the manufacturing process, and may or may not be desired. There are a number of options. A first option is that the electrode patterns and dielectric layer are planarized in which case the layer 131 is not present. A second option is to planarize but also cover the structure with a homogeneous layer (not shown). A third option is not to planarize. In this case, bumps 131 will be automatically created by the dielectric layer deposition over the electrode portions 122. They may function as movement limiting stops.

Planarization is only needed if very thick electrodes and high-k dielectric layer are used, but a small gap $y_0$ is required. In this case, the bumps could be larger than $y_0$. Thin electrodes on a thick, homogeneous high-k dielectric layer could avoid the need for planarization.

Figure 7:
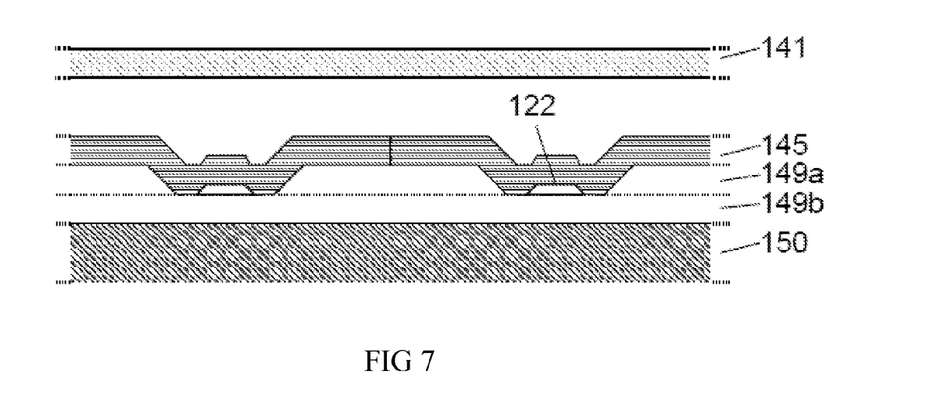
FIG. 7 shows a fourth example of MEMS capacitor design of the invention.

FIG. 7 shows an arrangement suitable for a switching actuator, namely one in which it is expected that the switch will be fully closed in operation. The electrode portions are shown as 122, and the dielectric layer is shaped so that it acts as a stop. The dielectric layer 145 contacts the electrode portions but is raised in the areas between the electrode portions, where it sits above a further dielectric 149a. A supporting layer of this dielectric is shown as 149b, on the substrate 150. The movable electrode 141 can collapse until it contacts the dielectric layer 145.

The field in the dielectric layer is smaller than it would be sandwiched between two electrodes, but it provides the full actuation force in the open state.

In this design, the dielectric material comprises portions adjacent and in contact with the electrode portions 122, and raised portions adjacent the spaces between the electrode portions. The raised portions provide mechanical contact areas. This design spreads the field away from the direct contact point and hence increases the electrical reliability.

In all examples, the patterned electrode can be the static or movable electrode.

The designs can also use tunability of the dielectric constant to provide further adjustment of the capacitance. Although a single high dielectric constant layer is shown, there may be such layers associated with both electrodes. The electrode portions can be parallel branches, as shown, but other electrode patterns are of course possible.

Figure 8:
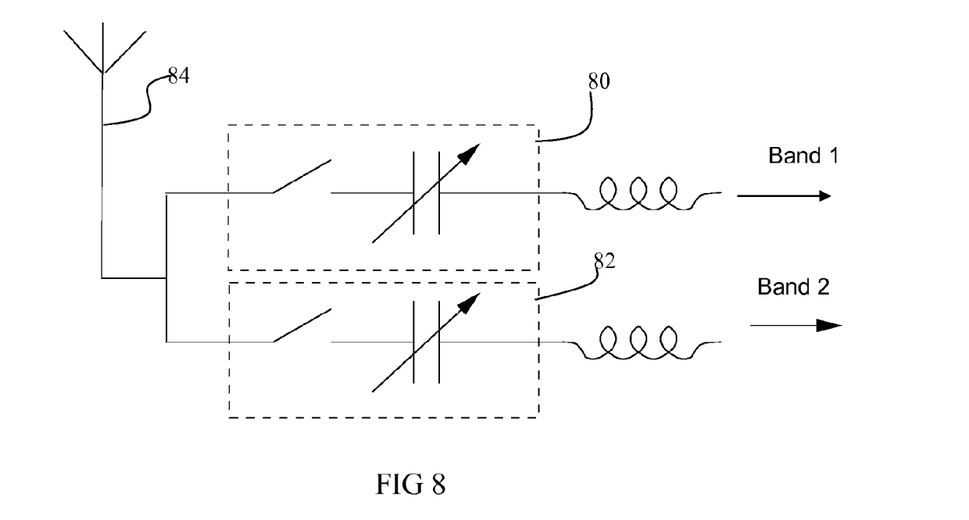
FIG. 8 shows capacitive MEMS switches of the invention used in a tunable antenna.

As mentioned above, one of the main applications of tunable MEMS capacitors is in tunable filters in the front-end of RF communications devices, such as mobile phones. Because the MEMS capacitor is switching the capacitance over a large ratio, it can effectively act as a switch. The tunable dielectric can be used for fine-tuning the filter frequency to the desired value. This is for example useful for implementing tunable filters and transmit/receive switches in mobile front-end of a mobile phone as shown in FIG. 13.

FIG. 8 shows two tunable MEMS capacitors 80,82 (indicated by a switch and a tunable capacitor) to provide tunable filters in two different frequency bands (band 1 and band 2) in the path of an antenna 84. Another possible application is antenna matching, where the MEMS would be a capacitor to ground and the antenna could be an inductive element. The arrangement could also provide switching between transmit and receive channels. There are many other options.

From the examples above, it will be seen that the main high permittivity dielectric layer can be over the patterned electrode, or simply in the spaces between electrode portions, forming a planar structure together with the electrodes. The electrode portions can form a comb structure as shown, but equally the segmented electrode arrangement could comprise a sheet electrode provided with an array of openings. Many different patterns are possible for providing electrode areas and spaces in the segmented electrode.

The actuator is of most interest as a tuneable capacitor or an electrical (capacitive) switch. However, other examples of possible application include an optical reflector, an ultrasound transmitter, a micropump, a micro-manipulator or a sensor.

The examples above show vertically moving electrodes. Horizontally (in-plane) moving devices are equally possible, e.g., comb structures. The electrodes then would be patterned laterally in the very same way as described above for the vertically moving devices. The high dielectric constant layer can then be between the spaces or below or above the electrode.

Various modifications will be apparent to those skilled in the art.

The invention claimed is:

1. A MEMS electrostatic actuator comprising:
   first and second opposing electrode arrangements, wherein at least one of the electrode arrangements is movable; and
   a dielectric material adjacent the second electrode arrangement;
   wherein the second electrode arrangement is formed on a low dielectric constant layer that is further formed on a substrate and the second electrode arrangement is patterned such that it includes electrode areas and spaces adjacent the electrode areas, and wherein the dielectric material extends at least partially in or over the spaces;
   wherein the dielectric material is formed in the same layer as the electrode areas and the dielectric material is divided by the electrode areas;
   wherein the second electrode arrangement and said dielectric material are designed such that $1 < k_0 < 2$, wherein $k_0$ is defined by:

$$k_0 = \sqrt{\frac{g^2}{\varepsilon_f d_f y_0}}$$

in which 2 g is the electrode spacing between the electrode areas, $\varepsilon_f$ is the dielectric constant of the said dielectric material, $d_f$ is the thickness of the said dielectric material and $y_0$ is the maximum electrode spacing.

2. An actuator as claimed in claim 1, wherein one electrode arrangement is movable and the other electrode arrangement is fixed.

3. An actuator as claimed in claim 2, wherein the movable electrode arrangement comprises a sprung structure suspended over the fixed electrode arrangement.

4. An actuator as claimed in claim 1, comprising a first dielectric region, with the said dielectric material in series with the first dielectric region between the first and second electrode arrangements.

5. An actuator as claimed in claim 4, wherein the first dielectric region has a lower dielectric constant than the said dielectric material and the said dielectric material has a dielectric constant higher than 10.

6. An actuator as claimed in claim 4, wherein the first dielectric region comprises a gas, fluid, vacuum or a soft polymer.

7. An actuator as claimed in claim 1, wherein the spacing between electrode areas is at least equal to the electrode area width.

8. An actuator as claimed in claim 7, wherein the spacing between electrode areas is at least 3 times the electrode portion width.

9. An actuator as claimed in claim 1, wherein the spacing between electrode portions is in the range 1 to 100 μm.

10. An actuator as claimed in claim 1, wherein the said dielectric material occupies a fraction of between 0.1 and 0.5 of the spacing between electrode arrangements in their open configuration.

11. An actuator according to claim 1, wherein the said dielectric material comprises portions adjacent and in contact with the electrode areas, and raised portions adjacent the spaces, which raised portions provide mechanical contact areas.

12. An actuator according to claim 1, wherein said dielectric material extends into the spaces by at least 0.5 $g/k_0$.

13. An actuator according to claim 1, further comprising an element selected from the group consisting of:
   a tuneable capacitor;
   an electrical switch;
   an optical reflector;
   an ultrasound transmitter;
   a micropump;
   a micro-manipulator; and
   a sensor.

14. An actuator according to claim 1, further comprising more than two electrodes.

15. An actuator according to claim 1, wherein the dielectric material and the electrode areas have horizontally co-planar surfaces, wherein the horizontally co-planar surfaces are opposite to the substrate.

* * * * *